United States Patent [19]

Bomball et al.

[11] 3,950,593

[45] Apr. 13, 1976

[54] PREGUMMED REMOISTENABLE TAPE HAVING LONG OPEN TIME AND SHORT TACK TIME

[75] Inventors: William A. Bomball; Thomas G. Swift, both of Decatur, Ill.

[73] Assignee: A. E. Staley Manufacturing Company, Decatur, Ill.

[22] Filed: Mar. 26, 1973

[21] Appl. No.: 344,658

[52] U.S. Cl. .................. 428/476; 427/207; 428/486
[51] Int. Cl.² ........................................... C09J 7/04
[58] Field of Search ............... 117/122 S, 156, 165; 428/476, 486; 427/207

[56] References Cited
UNITED STATES PATENTS

| | | | |
|---|---|---|---|
| 2,188,329 | 1/1940 | Bauer et al. | 117/122 |
| 2,332,137 | 10/1943 | Drew | 117/122 |
| 2,400,995 | 5/1946 | Humphner | 117/122 |
| 2,477,344 | 7/1949 | Neumann | 117/122 |
| 2,791,512 | 5/1957 | Hatch et al. | 117/156 X |
| 2,803,611 | 8/1957 | Lamm | 117/122 |
| 3,095,391 | 6/1963 | Brockway et al. | 117/155 X |
| 3,285,764 | 11/1966 | Nelson et al. | 117/122 X |
| 3,387,998 | 6/1968 | Powers | 117/156 |
| 3,408,214 | 10/1968 | Mentzer | 117/156 X |
| 3,425,968 | 2/1969 | Reiling | 117/122 X |
| 3,560,247 | 2/1971 | Robinson | 117/122 X |
| 3,640,756 | 2/1972 | Beersma | 117/122 X |
| 3,690,938 | 9/1972 | Swift | 117/122 |

Primary Examiner—Bernard D. Pianalto

[57] ABSTRACT

A pregummed, remoistenable tape having long open time and short tack time which utilizes adhesive formulations using acid hydrolyzed, derivatized waxy maize starch as a component to replace animal glue in remoistenable, pregummed tape formulations. Wet tack strength is equal or better than "all-animal glue" adhesives presently used, especially for short open times. In one embodiment, the major ingredient in the adhesive coating of the pregummed tape comprises waxy maize starch which is first acid-hydrolyzed and then copolymerized with acrylamide monomer using a free radical initiator in an aqueous system.

In another second embodiment, acid-hydrolyzed, cyanoethylated waxy maize starch provides the major adhesive ingredient which replaces a substantial portion of the animal glue in the adhesive composition used to coat the pregummed tape. It is also contemplated that substantially all of the animal glue in the new formulation can be replaced for certain applications with a synthetic organic compound such as polyvinyl alcohol.

These combination vegetable-animal base adhesives and the vegetable synthetic type adhesives may be used to replace animal glue based adhesives, and provide improved machinability, less odor, easier remoistenability of the pregummed tape under cold room conditions and improved aging.

Of the many modified starch combinations tested, on remoistenable pregummed tapes the acid-hydrolyzed, cyanoethylated starch derivative and acid-hydrolyzed, acrylamide-starch graft copolymers performed the best, especially in combination with small amounts of animal glue.

6 Claims, No Drawings

PREGUMMED REMOISTENABLE TAPE HAVING LONG OPEN TIME AND SHORT TACK TIME

BACKGROUND OF THE INVENTION

The fluctuating supply of materials used to make animal glues makes the availability of a replacement extremely desirable. There is an ever increasing need for shipping boxes as metropolitan areas grow with general populatin growth. More items must be shipped longer distances to market, and adhesives must be adapted for automated boxmaking equipment as labor costs increase.

Remoistenable adhesives are required for many applications, particularly corrugated box manufacture. For many years, animal glues obtained from the hooves, hides, and other water soluble proteinaceous portions of cattle, sheep, horses and pigs slaughtered for market have provided the bulk of the adhesives used to coat pregummed tapes. Such tapes are used in automatic box-making machines, which wet and apply the pregummed adhesive tapes very rapidly.

FIELD OF THE INVENTION

The fabrication of paper boxes is done on automated machinery, in which the pregummed tape is remoistened and applied almost instantaneously to the box being fabricated. It is extremely important that the tape be instantly remoistenable, and bond very rapidly upon application to the box. The properties which are useful in a remoistenable adhesive may also make the product useful as paper sizings or for coating binder applications.

DESCRIPTION OF THE PRIOR ART

Canadian Patent 850,534, issued Sept. 1, 1970 describes a modified, acid-hydrolyzed starch used in combination with hide glue and plasticizer. Only hide glues having a gel strength of at least 100 g. are recommended for use in this reference, and the specification discloses chemical modifications in only a general way. The disclosure specifically mentions that bone glue is not satisfactory for use in the composition described and claimed. All of the examples and the claims describe only acid modified or enzyme modified starches. In one example, the starch also had been hydroxyethylated to a degree of substitution of 0.07. This was apparently the only modification to this particular starch derivative (Table 3 of specification, Canadian Patent 850,534). Applicants have found that acid-hydrolyzed waxy maize starches and acid-hydrolyzed, derivatized starches such as with hydroxyethyl, hydroxypropyl and quaternary ammonium derivatives, do not perform as well as the acid-hydrolyzed, cyanoethylated and the acid-hydrolyzed starch-acrylamide graft copolymers of the subject invention.

U.S. Pat. No. 2,791,512, issued May 7, 1957, to Hatch et al., describes an acid-hydrolyzed, hydroxyethyl or carboxymethyl substituted starch compound used with or without animal glue. This composition also differs from that of the subject invention because it does not disclose the particular derivatives which applicants have discovered give superior remoistenable adhesive performance, especially under automatic box making conditions, in which rapid development bond strength is extremely important. Another combination is disclosed in U.S. Pat. No. 3,408,214, issued Oct. 29, 1968 to Mentzer. This latter reference utilizes propylene and polyethylene glycols and plasticizers in combination with acid modified waxy starches, also in an attempt to obtain improved open times and improved bond times in remoistenable pregummed tapes. A hydroxyethyl ether red milo starch derivative is also described. In each example, and in the claims, either propylene glycol or polyethylene glycol is included as an essential ingredient of the adhesive formulations. The purpose of the glycol addition is to improve open time and bond time for the adhesive composition, although the reason for the improvement is not explained. Applicants have obtained superior bond times without the use of glycol additions through the particular cyanoethyl and acrylamide-starch derivatizations described herein.

Japanese Patent Specification 12635/71 discloses a remoistenable adhesive composition containing an unmodified waxy maize starch combined with hide glue, dextrin, and sodium nitrate which is recommended for paper tapes. Applicants have found that such a starch-animal glue combination does not perform as well as the acid-hydrolyzed, derivatized starch compounds as set forth in the following detailed description of the invention.

DETAILED DESCRIPTION OF THE INVENTION

This invention contemplates the use of two specifically derivatized, acid-hydrolyzed, waxy maize type starches. A great number of derivatized starches were tested for use in an adhesive composition to replace animal glues in remoistenable adhesive compositions for pregummed tapes, particularly for fiber-reinforced pregummed remoistenable tapes used to fabricate corrugated paper boxes. The actual tests using a Werle Tack Tester (available from Thwing-Albert Instrument Company, Philadelphia, Pa.), showed applicants' adhesives can replace animal glue.

By actual performance, it was discovered that an acid hydrolyzed, cyanoethylated waxy maize and an acid-hydrolyzed, acrylamide-starch graft copolymer performed substantially better than any of the other starch derivatives tested, as will be set forth in more detail below. An acrylamide-starch graft copolymer suitable for use in the subject invention is described in U.S. Pat. No. 3,095,391 issued June 25, 1963, to Brockway et al. It has been found that the acid hydrolysis of the base starch should be performed prior to the derivatization-polymerization step.

The derivatized, acid-hydrolyzed starch can be used in combination with animal glue in ratios from 9:1 to 1:9. In at least one embodiment, animal glue can be eliminated, provided that a small portion of polyvinyl alcohol is included. The derivatized, acid-hydrolyzed starch may be used in combination with animal glue in the above ratios, with from 0 to 50% by weight of dextrin and 0 to 20% by weight of a plasticizer-humectant. The excellent initial wet tack is obtained with or without added dextrin, and with or without added plasticizer-humectant. Using the Werle tack test described herein, the pregummed remoistenable tapes of this invention consistently developed 100 g peel resistance within 3–5 seconds. As used herein, the term "remoistenable" means remoistenable with water.

The acid-hydrolyzed, cyanoethylated waxy maize starch can be prepared as generally described in U.S. Pat. No. 3,387,998 issued June 11, 1968, to Powers. The specific embodiments which applicant has found successful are described in more detail below. In general terms, it can be stated that this invention contemplates the substitution in an animal glue adhesive with either one of two acid-thinned, specifically derivatized waxy maize starch compounds. The starch derivatives may be used to replace a substantial portion of the animal glue, and when polyvinyl alcohol is included in the adhesive formulation, it is possible to replace substantially all of the animal glue without loss of adhesive performance upon remoistening.

EXAMPLE I

An adhesive formulation was made up in the following proportions:

| | |
|---|---|
| cyanoethylated, acid-hydrolyzed waxy maize starch (See Example II) | 67 parts |
| canary dextrin | 20 parts |
| 81–100 g jelly strength animal glue | 10 parts |
| urea | 10 parts |
| petrolatum | .25 parts |
| sodium hexamethaphosphate | .10 parts |

This formulation was coated on a standard, fiber reinforced tape samples as prescribed for the Werle Tack Tester. These samples measure 20 by 1½ inches. After drying the tapes, they were observed to be flat with no curl. These samples were then evaluated for remoistenability performance under varying test conditions on the Werle Tack Tester. The tapes were remoistened and applied to standard size paper sheets simulating paper box surfaces, and then the test tapes were pulled from the surfaces. The Example I adhesive formulation gave excellent performance, and was compared to the acid-hydrolyzed waxy maize starch adhesive suggested in Canadian Patent 850,534.

A one or two step cooking procedure for the adhesive formulation is selected, depending on the components of the particular formulation. Some animal glues tend to lose gel strength through hydrolysis if heated above certain specified temperatures. Therefore, a two step cooking procedure may be best. An example of such a procedure is set forth below:

Two Step Cooking Procedure: In a 250-ml beaker slurry 88 g of the derivatized starch in 101 g water. Stir and cook on the steam bath at above 190°F. for 20 minutes. Cool to 160°F. and add 4.4 g animal glue (162 g jelly strength, DARLING) preswollen in an equal weight of water. Dissolve animal glue by slight heating if required. Cool to 140°–150°F. and adjust weight for moisture loss. The adhesive is now ready for application.

When the components of the adhesive are judged to be stable under higher temperatures and pre-swelling of the animal glue was not necessary, the following cooking procedure was used:

One Step Cooking Procedure: In a 250-ml beaker slurry 88 g of derivatized starch and 12 g urea in 110 g water. Stir and cook on the steam bath at above 190°F for 20–30 minutes. Cool to 140°–150°F. and readjust weight for moisture loss. The adhesive is now ready for application. Other plasticizers, such as sodium nitrate, calcium-chloride-sodium nitrate in combination, and sorbitol can be used instead of all or part of the urea plasticizer.

As mentioned above, in connecton with Example I, all the tapes were evaluated on the Werle Tack Tester, using the tentative procedure recommended by the Gummed Industries Association with some minor modifications. For example, instead of testing twelve samples, six of each tape type were tested in interests of expediency for very extensive test program. The Werle Tack Tester is manufactured by Thwing-Albert Instrument Company, Philadelphia, Pa., and is believed to be particularly suitable for comparing pregummed tape performances under substantially identical conditions. A detailed description of the test procedure is set forth below:

TAPE PREPARATION

The various adhesive formulations were applied to the felt side of International Paper 60 lb. raw gumming stock. In most cases, a No. 24 wire wrapped rod was preheated to 140°–150°F. and the adhesive, also at that temperature, was applied in a single drawdown. The coated sheet was allowed to dry, and was then drawn, uncoated side down, over a "breaker bar" to form in the coating a network of very fine cracks to air in the penetration of water during remoistening. The 22 inch × 9 inch sheet was cut lengthwise into 1½ inch wide strips on a paper cutter and allowed to equilibrate overnight or longer at 50% relative humidity (RH) and 75°F.

The tapes, after conditioning, were evaluated for wet tack and open time in a room held at 50% RH and 75°F. on the Werle TAck Tester. Wet tack is measured as follows:

1. The timers for open and closed time are set for open time of 2.0 seconds and a closed time of 1.0 seconds.
2. One end of the test strip is clamped in the lower jaw, adhesive side up; the other end is slid under the rod carriage and secured in the lower clamp.
3. A No. 24 Meyer rod (designed to deliver 17 lb. water/3000 ft$^2$) is inserted in the rod carriage and positioned on the tape strip.
4. The top substrate, 1 inch wide 60 No. Golden Brown Nibroc Kraft Gumming Paper (Gummed Industries Association standard tape), is clamped at one end in the left top jaw and at the other end in the roller clamp. This tape is parallel to and suspended above the bottom substrate.
5. The lamination roller is placed in its cradle.
6. Machine power is switched on and operated in automatic.
7. The recording chart pen is set to allow direct reading from zero time when using a 2.0 second open time.
8. About 1 ml of distilled water is placed on the adhesive substrate directly in front of the bar carriage with a disposable pipet.
9. The start button is pushed and the wire rod deposits water on the adhesive coating.
10. After the pre-set open time, the upper substrate is bonded to the adhesive tape by a weighted rubber covered roller traveling at uniform speed.
11. After the pre-set closed time, the bottom jaw drops to take up slack in the bonded tapes and begins moving downward at a constant speed of 1 inch/second. This separates the lamination at one-half inch/second.
12. The force required to separate the lamination by peeling is continuously recorded on the chart.
13. Two arbitrary values selected from the Gummed Industries Association, Dwell Time to 20 gm peel resistance and Dwell Time to 100 gm peel resistance, are used to evaluate the relative wet tack strengths of adhesives.

Open time is measured as follows:
1. The same procedure as described in steps 1–10 above are followed except the open time timer is set to give 30 seconds open time and the closed time timer is set at about 15 seconds to allow time for removal of tests strip from the machine.
2. The lamination is not tested in the machine, but is removed and allowed to dry for a minimum of two hours.
3. After two hours, the strips are peeled by hand from the end nearest the peeling jaw. All unadhered areas are exposed and the percentage area permanently bonded is recorded as percentage "fibre tear at 30 seconds open time".

The above procedure was used throughout the tests, and direct comparisons were made and recorded. In one such series of tests, the adhesive composition of Example I was compared to an adhesive composition suggested by Canadian Patent 850,534, especially for peel resistance. This procedure generally follows the Gummed Ind. Assn. testing procedure No. 203TM67.

Many other criteria are considered, in addition to peel resistance, when evaluating the performance of a particular adhesive. However, peel resistance (rapid development of wet tack strength) is believed to be the most important criteria for evaluating remoistenable pregummed tape adhesives. The Werle Tack Tester is particularly designed to provide a good comparison of peel resistance. The shorter time periods are the better results in this test.

Using the Werle Tack Tester procedure described above, the results observed were:

| EXAMPLE I | | CANADIAN (CH$_3$COOH-waxy starch-acid hyd. +NaNO$_3$) |
|---|---|---|
| Development of Peel Resistance | Time | Time |
| 20 g | 2.3 seconds | 4.2 seconds |
| 100 g | 4.8 seconds | 6.6 seconds |

Example I also developed 90–100% fiber pull, even after 30 seconds open time, i.e., the time elapsed between rewetting the tape, and application to a surface (paper) for the test.

EXAMPLE II

Cyanoethylated, acid-hydrolyzed waxy maize starch was prepared by slurrying 1,125 g of waxy maize starch in 1,410 g of water, and adding to this 300 g of a caustic brine solution comprising a mixture ratio of 31 ml water, 47 g of 50% NaOH, and 326 g of saturated NaCl solution (35.8 g NaCl/100 ml H$_2$O). Approximately 40 g of acrylonitrile was added to the reaction slurry and allowed to react for about seventeen hours at 110°F. The reaction mixture was then neutralized using concentrated H$_2$SO$_4$. The slurry temperature was then increased to 126°F. for five hours to acid-hydrolyze the derivatized starch. the product was then neutralized with 14.83% Na$_2$CO$_3$.

The resulting neutralized slurry is filtered and dried, and the acid-hydrolyzed, cyanoethylated waxy maize starch so obtained has a degree of substitution of cyanoethyl groups in the range from about 0.03–0.09, and preferably about 0.045. This is a typical starch based derivative which can be used in the practice of this invention as set forth in Example I. For some applications, the adhesive formulation can be modified from Example I to the extent that dextrin, urea (or other plasticizer), petrolatum, and sodium hexametaphosphate can be completely eliminated. In most cases, however, it has been found desirable to include a plasticizer-humectant to aid in rapid remoistening of the tape.

EXAMPLE III

The acid-hydrolyzed waxy maize starch-acrylamide graft copolymer used in the adhesive composition of the invention was prepared generally as follows:

Into a 2-l. reactor (equipped with condenser, thermometer, stirrer and glass inlet tube for introducing nitrogen gas into the reaction mixture) was charged 700 g of acid-hydrolyzed, waxy maize starch, 70 g of 1.14M/AGU acrylamide and 1,400 ml of distilled water (previously boiled and cooled). Nitrogen gas was bubbled into the stirred mixture. After 1½ hours, 1.54 g of ascorbic acid was added, and 2 minutes later, 1.47 ml of 10% aqueous hydrogen peroxide. Polymerization was initiated, and the temperature rose from 25.5°C. to 33.5°C. in 15 minutes. The reaction mixture was held at 38°–40°C. for about one hour during which there was a further slight increase in the viscosity of the reaction mixture. The viscous mixture was cooled (ice-water bath) to 25°C. and the insoluble product removed by vacuum filtration. The wet filter cake was slurried 3 times with 1-l. of distilled water and vacuum filtered. The wet filter cake was broken up, air-dried and ground in a Wiley Mill (1.0 mm screen). The starch derivative so obtained contained about 12% moisture and about 20-25% polyacrylamide.

EXAMPLE IV

An adhesive formulation using the starch derivative of Example III was made up as follows:

Acid-Hydrolyzed Waxy Maize Starch-Acrylamide Graft Copolymer Adhesive Formulation 1. Disperse the following ingredients in 120 parts tap water at room temperature:

| | | |
|---|---|---|
| (a) | hydrolyzed waxy maize starch-acrylamide copolymer | 67 parts |
| (b) | canary dextrin | 20 parts |
| (c) | 81–100 g jelly strength animal glue | 10 parts |
| (d) | Urea | 10 parts |
| (e) | petrolatum | 0.25 parts |
| (f) | sodium hexametaphosphate | 0.10 parts |

2. Heat to 185°F. with mechanical agitation and maintain at 185°–205°F for 30 minutes.
3. Cool to 135°–170°F. and apply to paper or fabric coating stock using any conventional type coating equipment.

Typical Werle Tack Tester data for a tape prepared using the above formulation is:
Tack time to:
    20 g peel resistance 2.3 seconds
    100 g peel resistance 4.2 seconds
        90–100% fibre tear after 30 seconds open time.
High quality animal glue tapes give typical values of:
    20 g peel resistance 2.1 seconds
    100 g peel resistance 4.0 seconds
        90–100% fibre tear after 30 seconds open time.

The above example, comparing the high quality animal glues with the adhesive formulation of Example IV, clearly shows that a completely satisfactory and economical replacement for the more scarce animal glues has been obtained. Animal glues are subject to fluctuating supply, and are generally much more expensive than the combination starch derivative-animal glue adhesives of this invention.

Until now, it has not been possible for applicants to obtain a comparable product which is primarily starch based, and which had an acceptable open time comparable to animal glue while retaining good adhesive or "gel" strength. The gel strength of animal glues is the primary method of determining their selling price. It is measured on a "Bloom" gelometer in which a cylinder is pressed into a gel at a rate of loading of 40 grams a second. The load required to produce a 4 mm. depression is determined. [See Ind. Eng. Chem. Anal. Ed. 2 (1930) 590; and U.S. Fed. Spec. Bd. for Glue: Animal, etc., No. C.G. 451 (1931)].

The following example also utilizes the starch derivatives of the invention, but without any added animal glue. Instead a small amount of polyvinyl alcohol is used in combination with the acid-hydrolyzed waxy maize starch-acrylamide graft copolymer of the invention, as set forth below.

EXAMPLE V

An adhesive formulation was made up using the starch derivative made as generally described in Example III in the following combination:

| | |
|---|---|
| Starch Derivative (Example III) | 90 parts |
| NaNO$_3$ (plasticizer) | 6 parts |
| Polyvinyl alcohol | 1.5 parts |
| Water - | sufficient to give about 45–60% solids |

The adhesive formulation was cooked and applied to the standard test tapes as described above and compared to a high quality animal glue adhesive on the Werle Tack Tester with the following results:

| Werle Tack Test (5 seconds open time) | | |
|---|---|---|
| Peel Resistance | Example V | Animal Glue |
| 20 g | 2.1 seconds | 2.1 seconds |
| 100 g | 3.2 seconds | 5.4 seconds |

It is interesting to note that Example V developed initial tack as quickly as the much more expensive animal glue formulation, and also developed full adhesive strength more rapidly than animal glue. The exact reason why the starch derivative-polyvinyl alcohol formulation can be successfully used as a complete replacement for animal glue is not known, and further study is being made of this discovery.

An exhaustive test program was conducted to evaluate many possible combinations of starch based adhesives which might replace all or part of the animal glue in rapidly remoistenable, pregummed tapes, which are particularly used in automatic box-making machines. The most important criteria in these evaluations were: rapid development of initial tack strength, and "open" times up to thirty seconds or longer. Bond strength measured by percent fiber pull was also considered an important property for these pregummed tapes. Other secondary, but important considerations in the evaluation were: wet curl, dry curl and gloss. The Werle Tack Tester and adhesive cooking and test sample preparation procedure described above was used throughout the tests, so that the most objective comparisons could be made. Many and varied chemical modifications of waxy maize starch were evaluated, including: acid-hydrolyzed waxy maize starch, hydroxyethyl and hydroxypropyl waxy maize starches (both acid-hydrolyzed and not acid hydrolyzed), acid-hydrolyzed quaternary ammonium waxy maize starch derivatives of varying degrees of substitution, acid-hydrolyzed carboxy methyl waxy maize starch derivatives (at different COOH levels), carboxy methyl acid-hydrolyzed, waxy maize starch-acrylamide graft copolymer and many others, in addition to the two derivatized products of the invention. The overall results focused attention on the two derivatized starches of the invention as particularly good replacements for substantially all of the animal glue in remoistenable, reinforced pregummed tapes. In all tests, these two starch derivatives were far superior in performance to other starch derivatives tested.

A most interesting and surprising observation was that the gel strength of the particular animal glue used in the formulation did not seem to affect the final performance of the pregummed tape adhesive. In Canadian Patent 850,534, hide glue having a gel strength of at least 100 g is required. Applicants have discovered that any animal glue seems to work well in their adhesive composition and gel strength may be considerably lower than 100 g. For example, animal glue having a gel strength of only 81 g has been used successfully.

The exact basis for this apparent synergistic behavior between the particular starch derivatives of the invention and the animal glue is not known at present. However, since both derivatized starches have nitrogen containing groups attached to the starch molecules by particular bonds (appparently not the same as the quaternary ammonium starch derivative) it is believed there is some definitive enhancing action on the animal glue protein by the nitrogen portions of these starch derivative molecules. All that is presently known is that the improved performance of these two starch derivatives was consistently repeated, and they are presently the best possible broad range starch derivative replacements for animal glue in remoistenable, pregummed reinforced tapes in which rapid tack development is important, and long open times are desirable.

As mentioned above, it is also contemplated that the particular starch derivatives of the invention may be used in combination with other ingredients besides animal glue. If the above theory is correct, it is believed possible to replace the animal glue with high protein vegetable materials such as soy protein, and possibly laboratory synthesized protein materials. The possibilities for complete independence of fluctuating world supplies of animal glue in pregummed tapes appear to be excellent at this time.

Since many embodiments of this invention may be made and since many changes may be made in the embodiments described, the foregoing is interpreted as illustrative and the invention is defined by the claims appended hereafter.

We claim:

1. A pregummed, water remoistenable fibre-reinforced tape for use in fabricating boxes on automatic box making apparatus, said tape having an open time of 20 seconds, said tape being coated with a remoistenable adhesive composition comprising an acid-hydrolyzed starch copolymerized with acrylamide, the starch being selected from the group consisting of waxy maize, waxy milo, tapioca, potato starches, and starches having high amylopectin levels; animal glue; and water such that the ratio of derivatized, acid-hydrolyzed starch to animal glue is in the range of 9:1 to 1:9, and the average Werle Tack Test for a reinforced pregummed tape coated with said adhesive composition remoistened with 17 pounds of water per three thousand square feet of tape employing an open time of 2.0 seconds and a closed time of 1.0 seconds is at least 100 g within less than 7 seconds.

2. A pregummed, remoistenable fibre-reinforced tape for use in fabricating boxes on automatic box making apparatus, said tape having an average Werle tack value of 20 g within 3 seconds and 100 g within 5.5 seconds after remoistening, and coated with an adhesive composition including a hydrolyzed waxy maize starch-acrylamide graft copolymer which comprises from 10% to 90% dry substance of said copolymer based on the total weight of the adhesive composition, and animal glue which comprises from 10% to 90% by weight based on the total weight of the adhesive composition.

3. The remoistenable, fibre-reinforced tape of claim 2, having an open time ranging from 0.10 seconds to 60 seconds.

4. A pregummed, remoistenable sheet material coated on at least one surface with a starch-animal glue adhesive composition comprising:
   a. 10 to 90% by weight acid-hydrolyzed, waxy maize starch, copolymerized with acrylamide;
   b. 10 to 90% by weight of animal glue;
   c. 0 to 50% by weight of dextrin; and
   d. 0 to 20% by weight of a plasticizer-humectant selected from the group consisting of sodium nitrate, urea, sorbitol, said tape developing an average Werle tack value of 20 g within 4 seconds and 100 g in less than 5.5 seconds, when remoistened with 17 pounds of water per 3,000 sq. ft. of tape.

5. The pregummed, remoistenable sheet material of claim 4, in which the acid-hydrolyzed, derivatized waxy maize starch comprises an acid-hydrolyzed acrylamide-starch graft copolymer having a nitrogen content in the range of 0.8 to 1.3% by weight, dry substance basis based on the weight of the starch.

6. A remoistenable, pregummed reinforced tape coated with an adhesive composition in the following proportions:

|  | PARTS |
|---|---|
| acid-hydrolyzed waxy starch-acrylamide graft copolymer | 90 |
| plasticizer (sodium nitrate) | 6 |
| polyvinyl alcohol | 1.5, |
| and water sufficient to provide a liquid adhesive composition prior to drying of about 45–55% solids, | | and having a Werle Tack Tester peel resistance when remoistened with 17 pounds of water per three thousand square feet of tape of about 2.1 seconds to develop 20 g peel resistance and about 3.2 second to develop 100 g peel resistance.

* * * * *